3,127,370
**METHOD OF MAKING FIBER-GRADE POLY-
ETHYLENE OVER A CHROMIUM OXIDE
CATALYST**
Albert J. Head, Bartlesville, Okla., assignor to Phillips
Petroleum Company, a corporation of Delaware
Filed May 28, 1958, Ser. No. 738,486
6 Claims. (Cl. 260—45.5)

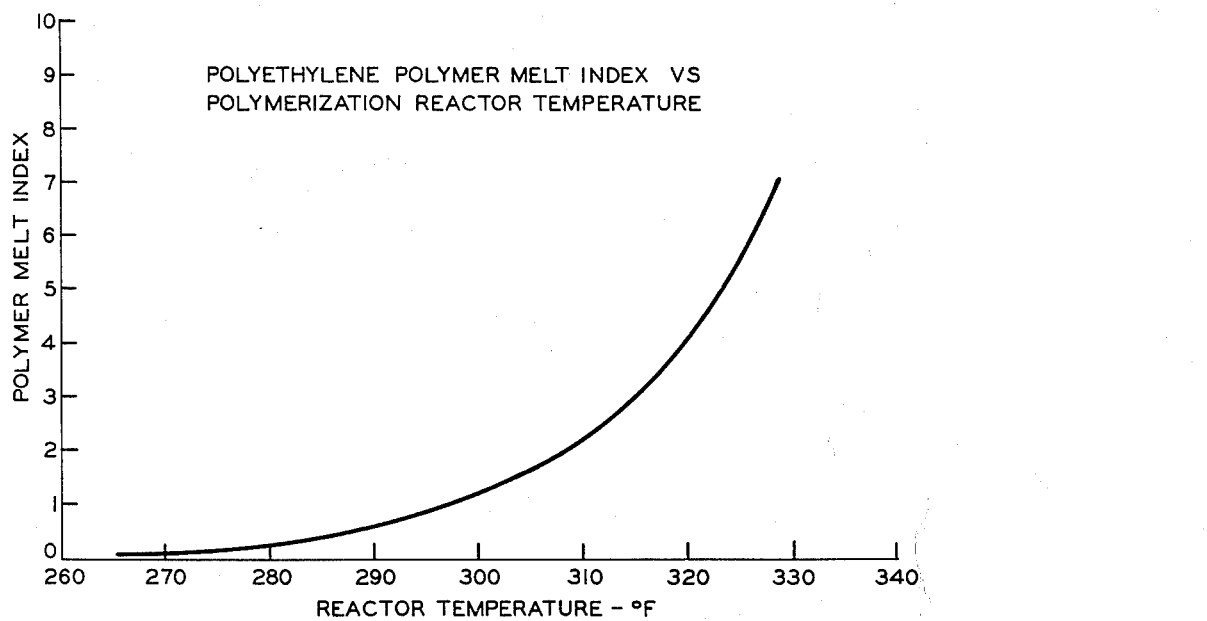

This invention relates to ethylene polymers for use in the formation of fibers and filaments and method for preparing said polymers. In one aspect the invention relates to fiber-grade polyethylene having a density of 0.94 or greater at 20° C. and a crystallinity of at least 70 percent, and preferably at least 90 percent at normal room temperatures, prepared in the presence of chromium oxide catalyst containing hexavalent chromium. In another aspect the invention relates to the preparation of fiber-grade polyethylene under controlled temperature conditions.

In the manufacture of high density, highly crystalline polyethylene as in other manufacturing processes, it has been the practice to operate with very close control over process variables such as temperature, pressure, flow rates, reaction times, etc., whereby products of maximum uniformity are obtained. In general, the resulting polymers have justified the effort and expense devoted to obtaining close control of process variables. However, in the case of polyethylene prepared in the presence of chromium oxide catalyst containing hexavalent chromium, it has been found that the polymer when used in the preparation of fibers does not provide uniform results. Thus, polymers prepared under apparently substantially the same conditions have provided both good and poor fiber material.

It is an object of this invention to provide high density, highly crystalline polyethylene prepared in the presence of chromium oxide catalyst containing hexavalent chromium, suitable for use in the preparation of fibers or filaments.

Another object of the invention is to provide an improved process for preparing fiber-grade, high density, highly crystalline polyethylene.

Still another object of the invention is to provide fiber-grade polyethylene having a density of at least 0.94 at 20° C. and a crystallinity of at least 70 percent, and preferably at least 90 percent, at normal room temperature.

Yet another object of the invention is to provide a process for the preparation of fiber-grade polyethylene having a density of at least 0.94 at 20° C. and a crystallinity of at least 70 percent, and preferably at least 90 percent, at normal room temperature.

The objects of the invention are achieved broadly by contacting ethylene with chromium oxide catalyst containing hexavalent chromium associated with a material selected from the group consisting of silica, alumina, zirconia, thoria, and composites thereof under conditions which produce normally solid polymer having a density of at least 0.94 at 20° C. and a crystallinity of at least 70 percent at normal room temperatures, including an average range of temperature variation of at least 3.0° F. and a maximum temperature differential of at least 10° F.

In one aspect of the invention, the polyethylene is prepared in at least two reactors with each reactor being operated at a different temperature, the effluent streams from the reactors are combined and the polymers from all of the reactors are recovered together.

In another aspect of the invention, the polyethylene is again prepared in more than one reactor at different temperatures, the effluent streams are processed separately and the finished polymers are "dry" blended together to provide a composite polymer product.

In still another aspect of the invention, the polyethylene is prepared in a single reactor under varying temperature conditions, the products obtained at the different temperatures being blended together. The variation in temperature conditions can be provided in several ways, for example, by maintaining a temperature gradient in the reactor, such as by indirect heat exchange with a heated or cooled fluid, or by direct heat exchange, such as by introducing one or more feed streams to the reactor at a temperature different from the reaction temperature, etc.

The fiber-grade, high density, highly crystalline polymer of this invention is prepared by contacting the olefin to be polymerized in the presence of chromium oxide catalyst containing hexavalent chromium associated with a material selected from the group consisting of silica, alumina, thoria, zirconia, and composites thereof, at an elevated temperature and pressure preferably in the presence of a solvent or diluent material. The temperature required for polymerization varies over a range of from about 250° to about 400° F. and preferably from about 265° to about 350° F.

The polymerization pressure is maintained at a sufficient level to assure a liquid phase reaction, that is, at least about 100 to 300 p.s.i.g. Higher pressures up to 500 to 700 p.s.i.g. or higher can be used if desired. When utilizing a fixed catalyst bed the space velocity varies from as low as 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is usually maintained between about 0.1 and about 15 percent by weight and the feed residence time can be from ten minutes or less to 10 hours or more.

The general polymerization conditions employed are described in the patent to Hogan et al., U.S. 2,825,721, issued March 4, 1958. This patent utilizes a chromium oxide catalyst containing hexavalent chromium, with silica, alumina, silica-alumina, zirconia, thoria, etc. In one embodiment of the patent olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by their high densities and high percentage of crystallinity at normal room temperatures.

The polymerization catalyst comprises chromium oxide containing hexavalent chromium associated with a material such as silica-alumina, silica-zirconia, etc. The catalyst can be prepared, for example, by contacting soluble salts of chromium with silica, alumina, thoria, etc., for sufficient period of time to impregnate the latter material. Following this excess liquid is removed, for example, by filtering after which the solid catalysts are dried and activated at temperatures in the range of 450° to 1500° F. For a more detailed discussion of the catalysts, their composition, and their method of preparation, reference can be had to Hogan et al. (2,825,721) wherein the catalysts are discussed in detail.

The solvent or diluent employed in the polymerization reaction includes, in general, paraffins which dissolve the polymers at the temperature employed in the reaction zone. Among the more useful solvents are paraffins having between about 3 and about 13 carbon atoms per molecule, such as propane, isobutane, normal pentane, isopentane, isooctane, etc., and preferably those paraffins having 5 to 12 carbon atoms per molecule. Also useful in the polymerization reaction are alicyclic hydrocarbons having 5 to 12 carbon atoms per molecule, such as cyclohexane, methylcyclohexane, methylcyclopentane, etc. Aromatic diluents are also used; however, in some instances they (or impurities therein) tend to shorten the catalyst life, therefore, their use will depend on the importance of catalyst life. All of the foregoing and in addition other hydrocarbon diluents, which are relatively inert and in the liquid state under reaction conditions, may also be employed in carrying out the polymerization reaction.

The high density, highly crystalline ethylene polymers produced in accordance with the method of Hogan et al. vary in their properties depending on the polymerization conditions employed. Thus, it has been found that the polymers vary widely in the ease with which they can be processed, for example, to form films, coatings, solid objects, etc., depending in particular on the temperatures at which the polymers are produced. Conventionally, these polymers are characterized as to their processability by the use of the property defined as melt index. As used herein, the term "melt index" defines the polymer property determined according to the procedure set forth in ASTM D-1238-52T modified as follows:

(1) Polymer charge 3 grams with 5-minute warmup.

(2) Five samples obtained at 5-minute intervals. Samples weighed and averaged. Any sample deviating more than ±5 percent from the average is discarded. Remaining samples are then averaged to provide the weight of polymer extruded in 10 minutes, which is the melt index.

It has been found that under the general conditions employed in preparing high density, highly crystalline polyethylene utilizing chromium oxide catalysts containing hexavalent chromium, the melt index is a function of the polymerization reaction temperature. In the accompanying figure there is presented a correlation between polymer melt index and reactor temperature. In the following discussion both melt index and reaction temperature will be used in defining the polymer products.

As previously stated, it has been found that polymers prepared apparently under substantially the same reaction conditions have provided both good and poor fibers. Thus, in some instances polymers having substantially the same melt indexes have varied widely in their ability to provide fiber-grade material. It has now been found that temperature is an essential factor in determining whether a polymer will or will not produce good fibers. It has been found that polymers prepared under close temperature control with minimum variations in temperature in general produce poor fiber grade material whereas polymers prepared under differing temperatures show improved fiber properties. Specifically, it has been found that polymers prepared with an average range of temperature variation of at least 3° F. based on temperatures determined at regular intervals and a maximum range of temperature variation of at least 10° F. possess properties which make them suitable for use in the production of fibers. More preferably, it is desirable to prepare the polymers under conditions such that the average range of temperature variation is between about 5° and about 75° F., and the maximum temperature variation is at least 15° F. A still more preferred average range of temperature variation is between about 8° and about 40° F. The reason or reasons why polymers prepared over a range of temperatures provide good fiber-grade material whereas polymers prepared under more uniform conditions do not, is not understood. According to one theory, good fibers are dependent on molecular weight distribution and polymers prepared over a temperature range are believed to have a wider molecular weight distribution.

A number of methods can be employed in providing the polymerization temperature variation required to produce good fiber-grade polymer. The method more usually employed comprises carrying out polymerization in at least two reactors with each reactor being operated under closely controlled temperature conditions but at a different temperature level. Thus, for example, one reactor can be operated at a temperature of about 272° F. to make a 0.2 melt index polymer and the other operated at about 295° F. to make a 0.9 melt index polymer. The reactor effluents are combined and the total effluent is processed to recover a polymer which is a composite of the two polymers prepared in the separate reactors, the final melt index of the polymer depending on the temperatures maintained in each reactor and the proportions of polymer produced in each reactor. In another method of operation, again two or more reactors are employed, each operating under closely controlled temperatures but at different levels. However, in this instance the reactor effluents are processed separately to provide dry polymer products. These products are then blended in the proportions desired to provide a composite polymer having an intermediate melt index and containing material prepared under the average and maximum temperature ranges previously set forth. In still another method the fiber-grade polymer is prepared in a single reaction zone with the desired temperature differential being provided in said zone. Since the polymerization reaction is exothermic and heat normally must be removed from the reaction zone, temperature variations therein can be provided by varying the amount of heat removed during the polymerization reaction. It is also possible to produce temperature variations by introducing one or more of the polymerization feed materials at lower temperatures than the polymerization reaction and at localized points in the reaction zone.

In addition to temperature variations per se, it has been found that certain fractions of polymer also have an important effect on the fiber quality of the polymer product. Thus, it has been found that the low melt index polymer prepared in the range of about 265° to 280° F. and varying in melt index from about 0.1 to about 0.35 enhances the fiber properties of the polymer. It is preferred that polymer prepared under these temperature conditions be incorporated in the polymer to provide between about 5 and about 75 percent by weight of the total polymer composition; preferably the amount of polymer prepared in the temperature range of 265° to 285° F. present in the total polymer is between about 10 and about 35 percent by weight.

The following data are presented in illustration of the invention.

EXAMPLE I

Samples of polyethylene were obtained from polymer prepared in a commercial plant in the presence of chromium oxide catalyst containing hexavalent chromium associated with silica-alumina, under the following general conditions:

| | |
|---|---|
| Ethylene feed rate _____ s.c.f.h__ | 2,400 to 28,900 |
| Temperature _____ °F__ | 271–322 |
| Pressure _____ p.s.i.g__ | 415–425 |
| Polymer concentration in reactor [1] _____ wt. percent__ | 6.0 to 9.0 |
| Catalyst concentration in reactor [1] _____ do____ | 0.03 to 0.08 |
| Number of reactors_____ | 2 to 6 |

[1] Based on cyclohexane diluent.

The polymer samples had a density of about 0.96 at 20° C. and a crystallinity of about 90 percent at room temperature. In each of the runs the polymers from the several reactors were blended while in solution and then further processed to recover dry polymer products. Tests for fiber properties were carried out in accordance with the following procedure: Polymer is introduced into a hopper which connects with an extruder. In the extruder the polymer is heated to 575° F. and extruded in the form of filaments, 18 in number, through orifices having a diameter of 0.023 inch. The extruded die head is positioned about ¼ inch to 2 inches from a water bath, the distance depending on the melt index of the polymer being extruded. The filaments are passed through the water bath which is maintained at about room temperature and over rollers, being stretched about 50 percent in the process. The filaments then enter a steam bath which is maintained at atmospheric pressure wherein they are stretched from between 9 to 1 to 10 to 1 times and then are wound on a spool.

In order to determine if the filaments are of good fiber grade, they are first stretched at a 10 to 1 ratio in the steam bath and then wound on the spool for 30 minutes. If a break occurs during the 30 minutes the test is repeated and again for a third time, if another break occurs. If during any of the three tests the run of 30 minutes is completed without a break, the polymer is considered to be good for use as fiber material.

If the fiber breaks in all three tests when stretched at 10 to 1, it is then tested by being stretched at 9½ to 1 in the steam bath. The same procedure is then followed, namely, three tests are run, if necessary, to try to obtain a filament which will not break. If one of the tests is successful the polymer is considered to have a rating of fair. The polymer is then retested at 10 to 1 stretch and if the test is successful it can be rated as good. If not, the rating remains fair. If none of the tests at 9½ to 1 are successful the polymer is then tested at a drawdown in the steam bath of 9 to 1. Again, three tests are carried out if required. If one of the tests is successful the polymer is rated as fair for fiber use. If none of the tests at 9 to 1 are successful the polymer is rated as poor.

The results of the fiber tests carried out on the polymer samples are presented in Table I.

Table I

| Sample | Melt Index | Fiber Quality | Sample | Melt Index | Fiber Quality |
|---|---|---|---|---|---|
| 1 | 1.20 | Good. | 15 | 0.88 | Fair. |
| 2 | 0.83 | Poor. | 16 | 0.90 | Good. |
| 3 | 0.90 | Do. | 17 | 1.02 | Poor. |
| 4 | 0.85 | Fair. | 18 | 1.47 | Do. |
| 5 | 1.03 | Poor. | 19 | 1.03 | Good. |
| 6 | 1.30 | Good. | 20 | 0.93 | Fair. |
| 7 | 0.79 | Poor. | 21 | 0.86 | Do. |
| 8 | 1.07 | Do. | 22 | 1.44 | Poor. |
| 9 | 0.72 | Do. | 23 | 1.37 | Do. |
| 10 | 0.97 | Do. | 24 | 0.80 | Good. |
| 11 | 0.73 | Do. | 25 | 1.40 | Fair. |
| 12 | 0.82 | Fair. | 26 | 1.40 | Do. |
| 13 | 0.97 | Poor. | 27 | 1.40 | Poor. |
| 14 | 0.89 | Do. | 28 | 1.40 | Do. |

In each of the runs of Table I operating conditions were controlled, within the limits of the instrumentation available, to maintain conditions nearly constant as possible, to provide polymer products having a particular melt index, ranging from about 0.9 to about 1.5. It is noted that polymers of substantially the same melt index vary in fiber quality from poor to good. To determine the effect of temperature on fiber quality the temperatures for each of the runs, taken from plant log sheets (at two-hour intervals), were obtained and are presented in Table II.

Table II

| Reactor No. | Run No. 1 | | | | | Run No. 2 | | | Run No. 3 | |
|---|---|---|---|---|---|---|---|---|---|---|
| | 1 | 2 | 3 | 4 | 6 | 1 | 2 | 3 | 1 | 2 |
| Temperatures | 285 | 289 | 304 | 294 | 288 | 292 | 292 | 286 | 290 | 290 |
| | 290 | 293 | 305 | 298 | 290 | 292 | 292 | 286 | 290 | 290 |
| | 277 | 291 | 303 | 291 | 290 | 292 | 292 | 286 | 292 | 290 |
| | 275 | 289 | 296 | 290 | 289 | | | | 290 | 289 |
| | | | | | | 291 | 291 | 286 | 290 | 288 |
| | 281 | 276 | 289 | 289 | 289 | 291 | 291 | 287 | 289 | 288 |
| | 284 | 279 | 286 | 286 | 288 | 291 | 291 | 287 | 290 | 288 |
| | 286 | 280 | 281 | 288 | 285 | 291 | 291 | 287 | 291 | 295 |
| | 284 | 278 | 279 | 285 | 285 | 282 | 292 | 287 | 297 | 295 |
| | 294 | 278 | 290 | 288 | 288 | 292 | 292 | 286 | 293 | 302 |
| | 302 | 285 | 298 | 298 | 286 | 292 | 292 | 286 | 290 | 292 |
| | 296 | 292 | 292 | 292 | 286 | 292 | 292 | 286 | 291 | 283 |
| | 286 | 285 | 293 | 292 | 289 | | | | 288 | 288 |

Table II.—Continued

| Reactor No. | Run No. 4 | | | | | Run No. 5 | | | | |
|---|---|---|---|---|---|---|---|---|---|---|
| | 1 | 2 | 3 | 4 | 6 | 1 | 2 | 3 | 4 | 6 |
| Temperatures | 291 | 291 | 292 | 295 | 288 | 278 | 278 | 279 | 292 | 292 |
| | 290 | 290 | 294 | 294 | 289 | 293 | 290 | 312 | 280 | 296 |
| | 292 | 292 | 292 | 292 | 290 | 292 | 287 | 290 | 294 | 291 |
| | 292 | 293 | 300 | 300 | 292 | 290 | 280 | 289 | 292 | 288 |
| | 294 | 293 | 298 | 290 | 292 | 289 | 286 | 288 | 292 | 294 |
| | 294 | 292 | 296 | 300 | 293 | 289 | 288 | 294 | 291 | 289 |
| | 293 | 292 | 297 | 294 | 295 | 289 | 294 | 293 | 292 | 289 |
| | 292 | 294 | 300 | 296 | 295 | 295 | 293 | 294 | 293 | 290 |
| | 307 | 293 | 297 | 296 | 295 | 300 | 294 | 295 | 295 | 293 |
| | 292 | 293 | 284 | 296 | 294 | 293 | 293 | 294 | 293 | 292 |
| | 283 | 292 | 293 | 295 | 294 | 293 | 293 | 293 | 293 | 293 |
| | 277 | 292 | 292 | 294 | 293 | 293 | 292 | 292 | 293 | 292 |
| | 278 | 278 | 279 | 292 | 292 | 304 | 292 | 291 | 284 | 290 |

| Reactor No. | Run No. 6 | | | Run No. 7 | | | Run No. 8 | | | | | |
|---|---|---|---|---|---|---|---|---|---|---|---|---|
| | 1 | 2 | 4 | 6 | 1 | 2 | 3 | 1 | 2 | 3 | 4 | 5 | 6 |
| Temperatures | --- | --- | 292 | 284 | 292 | 292 | 292 | 298 | 296 | 298 | 296 | 291 | 293 |
| | --- | --- | 296 | 294 | 294 | 294 | 293 | 302 | 296 | 298 | 296 | 290 | 292 |
| | --- | --- | 290 | 293 | 294 | 293 | 294 | 294 | 295 | 296 | 294 | 290 | 292 |
| | --- | --- | 299 | 297 | 295 | 294 | 294 | 293 | 295 | 296 | 294 | 290 | 292 |
| | --- | 288 | 294 | 280 | 295 | 294 | 294 | 292 | 294 | 294 | 294 | 292 | 293 |
| | --- | 289 | 293 | 283 | 295 | 294 | 294 | 295 | 296 | 298 | 294 | 291 | 293 |
| | --- | 290 | --- | --- | 296 | 295 | 295 | 293 | 295 | 295 | 294 | 291 | 292 |
| | --- | 289 | 289 | 296 | 296 | 296 | 296 | 296 | 297 | 313 | 294 | 305 | 292 |
| | 295 | 289 | 294 | 295 | 296 | 295 | 296 | 293 | 295 | 297 | 294 | 292 | 293 |
| | 288 | 289 | 294 | 298 | 297 | 297 | 297 | 295 | 296 | 298 | 294 | 292 | 293 |
| | 291 | 284 | 286 | 288 | 295 | 295 | 296 | 295 | 296 | 297 | 295 | 292 | 293 |
| | 300 | 282 | 295 | 292 | 285 | 296 | 296 | 295 | 296 | 296 | 295 | 292 | 293 |
| | --- | --- | --- | 295 | 296 | 294 | 295 | 296 | 296 | 295 | 293 | 293 | |

| Reactor No. | Run No. 9 | | | | | | Run No. 10 | | | | | |
|---|---|---|---|---|---|---|---|---|---|---|---|---|
| | 1 | 2 | 3 | 4 | 5 | 6 | 1 | 2 | 3 | 4 | 5 | 6 |
| Temperatures | --- | 290 | 294 | 290 | 283 | 288 | 295 | 296 | 296 | 295 | 293 | 293 |
| | --- | 290 | 292 | 291 | 286 | 288 | 294 | 296 | 296 | 294 | 293 | 294 |
| | --- | 290 | 290 | 290 | 286 | 287 | 294 | 296 | 296 | 294 | 293 | 292 |
| | 293 | 292 | 293 | 291 | 287 | 289 | 292 | 293 | 294 | 292 | 292 | 292 |
| | 295 | 293 | 293 | 293 | 290 | 291 | 291 | 291 | 291 | 291 | 296 | 291 |
| | 295 | 293 | 294 | 293 | 290 | 290 | 293 | 293 | 292 | 295 | 291 | 290 |
| | 295 | 294 | 296 | 294 | 291 | 291 | 293 | 293 | 294 | 291 | 292 | 291 |
| | 295 | 298 | 298 | 294 | 292 | 292 | 293 | 293 | 295 | 292 | 292 | 291 |
| | 296 | 300 | 301 | 296 | 292 | 290 | 293 | 293 | 295 | 291 | 292 | 291 |
| | 296 | 296 | 290 | 294 | 297 | 290 | 293 | 293 | 295 | 292 | 293 | 291 |
| | 295 | 295 | 298 | 296 | 292 | 293 | 291 | 291 | 294 | 292 | 292 | 291 |
| | 296 | 296 | 298 | 296 | 292 | 293 | 293 | 293 | 295 | 292 | 292 | 291 |
| | 298 | 296 | 298 | 296 | 291 | 293 | 293 | 293 | 295 | 292 | 293 | 292 |

| Reactor No. | Run No. 11 | Run No. 12 | | | | | Run No. 13 | | | |
|---|---|---|---|---|---|---|---|---|---|---|
| | 1 | 2 | 2 | 3 | 4 | 5 | 6 | 1 | 2 | 3 | 4 | 6 |
| Temperatures | 292 | 292 | 290 | 292 | 292 | 285 | 286 | 284 | 290 | 293 | 298 | 289 |
| | 292 | 292 | 285 | 292 | 295 | 281 | 288 | 286 | 291 | 292 | 292 | 282 |
| | 292 | 292 | 293 | 295 | 294 | 281 | 288 | 289 | 290 | 292 | 276 | 290 |
| | 291 | 294 | 283 | 288 | 293 | 284 | 287 | 289 | 290 | 293 | 280 | 286 |
| | 291 | 292 | 286 | 289 | 291 | 284 | 286 | 289 | 290 | 291 | 283 | 283 |
| | 291 | 292 | 282 | 289 | 292 | 284 | 286 | 289 | 289 | 284 | 290 | 282 |
| | 291 | 291 | 286 | 290 | 292 | 284 | 286 | 288 | 290 | 291 | 290 | 281 |
| | 292 | 294 | 286 | 290 | 292 | 285 | 286 | 285 | 291 | 294 | 298 | 290 |
| | 292 | 293 | 288 | 290 | 292 | 285 | 286 | 290 | 291 | 295 | 294 | 293 |
| | 292 | 293 | 288 | 290 | 293 | 285 | 290 | 292 | 295 | 293 | 287 | |
| | 292 | 293 | 288 | 291 | 292 | 285 | 295 | 291 | 288 | 296 | 288 | 295 |
| | 292 | 292 | 288 | 291 | 292 | 285 | 285 | 292 | 290 | 294 | 293 | 291 |
| | 292 | 292 | 288 | 291 | 292 | 285 | 284 | 291 | 291 | 292 | 295 | 288 |

| Reactor No. | Run No. 14 | | | | | Run No. 15 | | | | |
|---|---|---|---|---|---|---|---|---|---|---|
| | 1 | 2 | 3 | 4 | 6 | 2 | 3 | 4 | 5 | 6 |
| Temperatures | 292 | 296 | 294 | 292 | 292 | 290 | 290 | 291 | 294 | 291 |
| | 291 | 294 | 294 | 283 | 292 | 276 | 286 | 291 | 289 | 290 |
| | 293 | 293 | 294 | 299 | 292 | 288 | 297 | 289 | 288 | 288 |
| | 291 | 293 | 294 | 290 | 289 | 289 | 283 | 290 | 283 | 288 |
| | 292 | 293 | 294 | 293 | 291 | 289 | 294 | 289 | 282 | 289 |
| | 291 | 292 | 293 | 292 | 291 | 290 | 290 | 289 | 281 | 286 |
| | 291 | 292 | 293 | 294 | 292 | 290 | 290 | 290 | 284 | 288 |
| | 290 | 292 | 293 | 290 | 290 | 290 | 294 | 290 | 285 | 288 |
| | 289 | 292 | 293 | 300 | 291 | 290 | 290 | 292 | 284 | 286 |
| | 290 | 293 | 294 | 394 | 292 | 290 | 290 | 292 | 292 | 288 |
| | 292 | 299 | 294 | 393 | 289 | 290 | 294 | 290 | 285 | 287 |
| | 292 | 293 | 294 | 397 | 292 | 290 | 289 | 291 | 286 | 290 |
| | 292 | 292 | 294 | 394 | 292 | 290 | 294 | 290 | 288 | 288 |

Table II.—Continued

| | Run No. 16 | | | | | Run No. 17 | Run No. 18 | | | | |
|---|---|---|---|---|---|---|---|---|---|---|---|
| Reactor No | 1 | 2 | 3 | 4 | 6 | 1 | 2 | 3 | 4 | 5 | 6 |
| Temperatures | 291 | 290 | 283 | 291 | 287 | 290 | 290 | 297 | 298 | 300 | 301 | 298 |
| | 288 | 290 | 291 | 292 | 287 | 290 | 290 | 297 | 298 | 299 | 298 | 298 |
| | 289 | 290 | 292 | 293 | 293 | 288 | 289 | 298 | 298 | 298 | 298 | 298 |
| | 289 | 291 | 292 | 291 | 290 | 288 | 289 | 298 | 298 | 298 | 298 | 298 |
| | 291 | 291 | 290 | 292 | 291 | 289 | 289 | 300 | 300 | 298 | 298 | 298 |
| | 275 | 277 | 277 | 271 | 278 | 289 | 289 | 300 | 300 | 298 | 296 | 298 |
| | 291 | 292 | 294 | 280 | 293 | 289 | 289 | 299 | 300 | 299 | 298 | 298 |
| | 296 | 287 | 295 | 310 | 293 | 288 | 288 | 298 | 300 | 299 | 302 | 297 |
| | 291 | 289 | 294 | 280 | 288 | 291 | 290 | 298 | 299 | 299 | 298 | 298 |
| | 292 | 289 | 293 | 290 | 288 | 291 | 291 | 298 | 299 | 299 | 298 | 296 |
| | 293 | 290 | 294 | 299 | 291 | 291 | 291 | 293 | 299 | 298 | 298 | 298 |
| | 293 | 291 | 294 | 292 | 292 | 291 | 291 | 299 | 299 | 298 | 299 | 297 |
| | 293 | 292 | 295 | 294 | 290 | 290 | 290 | 297 | 298 | 298 | 300 | 298 |

| | Run No. 19 | | | | | Run No. 20 | | | | | |
|---|---|---|---|---|---|---|---|---|---|---|---|
| Reactor No | 1 | 2 | 3 | 4 | 6 | 1 | 2 | 3 | 4 | 5 | 6 |
| Temperatures | 304 | 292 | 291 | 284 | 290 | ---- | 290 | 294 | 290 | 288 | 288 |
| | 389 | 290 | 292 | 282 | 290 | ---- | 290 | 292 | 291 | 286 | 288 |
| | 391 | 289 | 289 | 289 | 289 | ---- | 290 | 290 | 290 | 286 | 287 |
| | 388 | 290 | 288 | 289 | 288 | 293 | 292 | 293 | 291 | 287 | 289 |
| | 391 | 290 | ---- | 292 | 288 | 295 | 293 | 294 | 293 | 290 | 291 |
| | 396 | 288 | ---- | 291 | 286 | 295 | 293 | 294 | 293 | 290 | 290 |
| | 396 | 291 | ---- | 290 | 289 | 295 | 294 | 296 | 294 | 291 | 291 |
| | 396 | 291 | ---- | 291 | 290 | 295 | 298 | 298 | 294 | 292 | 292 |
| | 390 | 290 | ---- | 290 | 288 | 296 | 200 | 201 | 296 | 292 | 290 |
| | 390 | 290 | ---- | 291 | 288 | 296 | 290 | 290 | 294 | 287 | 290 |
| | 388 | 390 | ---- | 291 | 288 | 295 | 295 | 298 | 296 | 292 | 293 |
| | 392 | 290 | ---- | 291 | 288 | 296 | 296 | 298 | 298 | 293 | 293 |
| | 391 | 290 | ---- | 291 | 287 | 298 | 296 | 298 | 296 | 291 | 293 |

| | Run No. 21 | | | | | Run No. 22 | | | | |
|---|---|---|---|---|---|---|---|---|---|---|
| Reactor No | 2 | 3 | 4 | 5 | 6 | 2 | 3 | 4 | 5 | 6 |
| Temperatures | 320 | 326 | 320 | 320 | 320 | 296 | 298 | 298 | 298 | 296 |
| | 320 | 320 | 321 | 320 | 320 | 298 | 298 | 298 | 298 | 296 |
| | 320 | 320 | 321 | 319 | 321 | 298 | 298 | 298 | 296 | 296 |
| | 320 | 320 | 320 | 319 | 321 | 297 | 297 | 297 | 296 | 296 |
| | 322 | 320 | 320 | 319 | 321 | 297 | 297 | 297 | 296 | 296 |
| | 321 | 320 | 320 | 319 | 321 | 298 | 291 | 297 | 297 | 297 |
| | 322 | 320 | 320 | 320 | 322 | 297 | 296 | 299 | 298 | 298 |
| | 321 | 321 | 320 | 320 | 322 | 297 | 297 | 299 | 300 | 298 |
| | 322 | 322 | 320 | 322 | 323 | 297 | 298 | 300 | 300 | 300 |
| | 321 | 321 | 320 | 322 | 321 | 297 | 298 | 300 | 300 | 298 |
| | 326 | 328 | 320 | 321 | 323 | 296 | 298 | 300 | 302 | 299 |
| | 320 | 321 | 320 | 320 | 321 | 297 | 298 | 300 | 300 | 300 |
| | 322 | 321 | 320 | 321 | 322 | 297 | 298 | 300 | 301 | 298 |

| | Run No. 23 | | | | | Run No. 24 | | | | | |
|---|---|---|---|---|---|---|---|---|---|---|---|
| Reactor No | 2 | 3 | 4 | 5 | 6 | 1 | 2 | 3 | 4 | 5 | 6 |
| Temperatures | 297 | 298 | 297 | 298 | 296 | 298 | 296 | 298 | 296 | 291 | 293 |
| | 296 | 298 | 296 | 295 | 295 | 302 | 296 | 298 | 296 | 290 | 292 |
| | 298 | 298 | 296 | 295 | 295 | 294 | 295 | 296 | 294 | 290 | 292 |
| | 297 | 298 | 296 | 295 | 296 | 293 | 295 | 296 | 294 | 290 | 292 |
| | 297 | 298 | 296 | 296 | 296 | 292 | 294 | 294 | 294 | 292 | 293 |
| | 298 | 298 | 296 | 296 | 296 | 295 | 296 | 298 | 294 | 291 | 293 |
| | 298 | 299 | 298 | 298 | 296 | 293 | 295 | 295 | 294 | 291 | 292 |
| | 298 | 298 | 298 | 299 | 296 | 296 | 297 | 313 | 294 | 305 | 292 |
| | 299 | 298 | 298 | 300 | 296 | 293 | 295 | 297 | 294 | 292 | 293 |
| | 298 | 299 | 298 | 299 | 296 | 295 | 296 | 298 | 294 | 292 | 293 |
| | 299 | 299 | 298 | 299 | 296 | 295 | 296 | 297 | 294 | 292 | 293 |
| | 300 | 300 | 299 | 300 | 297 | 295 | 296 | 296 | 294 | 292 | 293 |
| | 299 | 300 | 298 | 300 | 296 | 295 | 296 | 296 | 295 | 293 | 293 |

| | Run No. 25 | | | | | Run No. 26 | | | | |
|---|---|---|---|---|---|---|---|---|---|---|
| Reactor No | 2 | 3 | 4 | 5 | 6 | 2 | 3 | 4 | 5 | 6 |
| Temperatures | 299 | 300 | 298 | 300 | 296 | 299 | 300 | 298 | 300 | 296 |
| | 300 | 300 | 298 | 300 | 298 | 300 | 300 | 298 | 300 | 298 |
| | 299 | 299 | 299 | 301 | 297 | 299 | 299 | 299 | 301 | 297 |
| | 298 | 298 | 298 | 298 | 298 | 298 | 298 | 298 | 298 | 298 |
| | 297 | 298 | 298 | 298 | 298 | 297 | 298 | 298 | 298 | 298 |
| | 298 | 298 | 298 | 297 | 296 | 298 | 298 | 298 | 297 | 296 |
| | 296 | 296 | 297 | 296 | 295 | 296 | 296 | 297 | 296 | 295 |
| | 296 | 296 | 298 | 296 | 294 | 296 | 296 | 298 | 296 | 294 |
| | 296 | 297 | 298 | 297 | 295 | 296 | 297 | 298 | 297 | 295 |
| | 295 | 297 | 298 | 296 | 294 | 295 | 297 | 298 | 296 | 294 |
| | 297 | 298 | 298 | 298 | 296 | 297 | 298 | 298 | 298 | 296 |
| | 296 | 297 | 298 | 297 | 295 | 296 | 297 | 298 | 297 | 295 |
| | 296 | 298 | 298 | 298 | 296 | 296 | 298 | 298 | 298 | 296 |

Table II.—Continued

| | Run No. 27 | | | | | Run No. 28 | | | | |
|---|---|---|---|---|---|---|---|---|---|---|
| Reactor No | 2 | 3 | 4 | 5 | 6 | 2 | 3 | 4 | 5 | 6 |
| Temperatures | 299 | 300 | 298 | 300 | 296 | 299 | 300 | 298 | 300 | 296 |
| | 300 | 300 | 298 | 300 | 298 | 300 | 300 | 298 | 300 | 298 |
| | 299 | 299 | 299 | 301 | 297 | 299 | 299 | 299 | 301 | 297 |
| | 298 | 298 | 298 | 298 | 296 | 298 | 298 | 298 | 298 | 296 |
| | 297 | 298 | 298 | 298 | 298 | 297 | 298 | 298 | 298 | 298 |
| | 298 | 298 | 298 | 297 | 296 | 298 | 298 | 298 | 297 | 296 |
| | 296 | 296 | 297 | 296 | 295 | 296 | 296 | 297 | 296 | 295 |
| | 296 | 296 | 298 | 296 | 294 | 296 | 296 | 298 | 296 | 294 |
| | 296 | 297 | 298 | 297 | 295 | 296 | 297 | 298 | 297 | 295 |
| | 295 | 297 | 298 | 296 | 294 | 295 | 297 | 298 | 296 | 294 |
| | 297 | 298 | 298 | 298 | 296 | 297 | 298 | 298 | 298 | 296 |
| | 296 | 297 | 298 | 297 | 295 | 296 | 297 | 298 | 297 | 295 |
| | 296 | 298 | 298 | 298 | 296 | 296 | 298 | 298 | 298 | 296 |

It is noted from the data in Table II that in many of the runs the temperature varied over a substantial range whereas in other runs little temperature variation occurred. The degree of temperature variation (average and maximum) was determined for each of the runs and is presented in Table II.

Table III

| Run No. | Fiber Quality | Average* Range of Temp. Variation, °F. | Maximum* Temp. Variation, °F. |
|---|---|---|---|
| 1 | Good | 10.3 | 30 |
| 2 | Poor | 3.9 | 6 |
| 3 | ----do---- | 4.2 | 19 |
| 4 | Fair | 5.7 | 23 |
| 5 | Poor | 6.6 | 34 |
| 6 | Good | 8.1 | 20 |
| 7 | Poor | 2.2 | 5 |
| 8 | ----do---- | 4.4 | 23 |
| 9 | ----do---- | 5.5 | 15 |
| 10 | ----do---- | 2.5 | 6 |
| 11 | ----do---- | 0.9 | 3 |
| 12 | Fair | 5.7 | 13 |
| 13 | Poor | 6.3 | 22 |
| 14 | ----do---- | 3.1 | 17 |
| 15 | Fair | 3.9 | 21 |
| 16 | Good | 6.5 | 29 |
| 17 | Poor | 1.8 | 4 |
| 18 | ----do---- | 1.6 | 6 |
| 19 | Good | 3.1 | 14 |
| 20 | Fair | 5.7 | 12 |
| 21 | ----do---- | 2.2 | 9 |
| 22 | Poor | 2.4 | 11 |
| 23 | ----do---- | 3.0 | 10 |
| 24 | Good | 3.4 | 8 |
| 25 | Fair | 2.4 | 7 |
| 26 | ----do---- | 2.4 | 7 |
| 27 | Poor | 2.4 | 7 |
| 28 | ----do---- | 2.4 | 7 |

*The maximum temperature variations presented in Table III were determined in each run by subtracting the maximum reactor temperature of the several reactors from the minimum reactor temperature of the several reactors, using the data from Table II.

Average temperature variations were determined from the same data in the following manner: A first temperature difference was determined by subtracting the highest individual temperature recorded in the several reactors from the lowest temperature recorded in the several reactors. These temperatures were then crossed off and the next highest and the next lowest temperatures were subtracted to obtain a second temperature difference. The same procedure was followed until all of the temperatures recorded were used to obtain temperature differences. Usually in each run a number of temperatures of the same magnitude were left over after the above calculations. The number of these temperatures was divided by two and considered as constituting zero differentials. Following this a numerical average of all of the differential temperatures was obtained to provide an average temperature difference or variation.

The average temperature variations of Table III were then grouped according to their magnitude as shown in Table IV.

Table IV

| Average temperature Variation, °F. | Number of Runs | | |
|---|---|---|---|
| | Good | Fair | Poor |
| 0-1 | 0 | 0 | 1 |
| 1-2 | 0 | 0 | 2 |
| 2-3 | 0 | 3 | 6 |
| 3-4 | 2 | 1 | 2 |
| 4-6 | 0 | 3 | 3 |
| 6-8 | 1 | 1 | 2 |
| 8+ | 2 | 0 | 0 |

It is noted from the data in Table IV that all of the good fiber material was obtained at an average range of temperature variation above 3.0° F., whereas the major proportion of the poor fiber materials was obtained with a temperature variation below 3° F.

The amount of polymer produced in various temperature ranges was also determined and is presented in Table V.

Table V

| Run No. | Fiber Quality | Percent Polymer Produced | | | |
|---|---|---|---|---|---|
| | | 0.1-0.35 M.I., 265-280° F. | 0.1-0.5 M.I., 265-285° F. | 0.1-0.65 M.I., 265-290° F. | Over 0.65 M.I., Over 290° F. |
| 1 | Good | 15.0 | 31.7 | 70.0 | 30.0 |
| 2 | Poor | 0 | 0 | 33.3 | 66.7 |
| 3 | do | 0 | 4.0 | 68.0 | 32.0 |
| 4 | Fair | 6.4 | 9.0 | 18.0 | 82.0 |
| 5 | Poor | 7.9 | 10.5 | 33.2 | 66.8 |
| 6 | Good | 4.8 | 19.0 | 59.5 | 50.5 |
| 7 | Poor | 0 | 0 | 0 | 100.0 |
| 8 | do | 0 | 0 | 6.0 | 94.0 |
| 9 | do | 0 | 0 | 28.0 | 72.0 |
| 10 | do | 0 | 0 | 1.0 | 99.0 |
| 11 | do | 0 | 0 | 0 | 100.0 |
| 12 | Fair | 0 | 40.5 | 78.5 | 21.5 |
| 13 | Poor | 2.7 | 13.3 | 56.2 | 43.8 |
| 14 | do | 0 | 1.3 | 10.3 | 89.7 |
| 15 | Fair | 2.2 | 19.4 | 79.2 | 20.8 |
| 16 | Good | 9.8 | 11.2 | 42.5 | 57.5 |
| 17 | Poor | 0 | 0 | 73.0 | 27.0 |
| 18 | do | 0 | 0 | 0 | 100.0 |
| 19 | Good | 0 | 3.0 | 64.2 | 35.8 |
| 20 | Fair | 0 | 0 | 31.3 | 68.7 |
| 21 | do | 0 | 0 | 0 | 100.0 |
| 22 | Poor | 0 | 0 | 0 | 100.0 |
| 23 | do | 0 | 0 | 0 | 100.0 |
| 24 | Good | 0 | 0 | 6.1 | 93.9 |
| 25 | Fair | 0 | 0 | 0 | 100.0 |
| 26 | do | 0 | 0 | 0 | 100.0 |
| 27 | Poor | 0 | 0 | 0 | 100.0 |
| 28 | do | 0 | 0 | 0 | 100.0 |

From the data in Table V it is apparent that in the major proportion of the runs which produced poor fiber-grade material (14 out of 16) none of the polymer was prepared in the temperature range of 260-285° F. (0.1 to 0.35 melt index). On the other hand, in the major proportion of the runs which produced good fiber-grade material (3 out of 5), approximately 5 percent or more of the polymer was produced in the temperature range of 265-280° F.

EXAMPLE II

To further establish the desirability of having polymer prepared in a particular temperature range present in the material utilized for the preparation of fibers, another series of polymerization runs were made under conditions similar to those of Example I. These runs were also carried out in a commercial installation. The polymers were tested as fibers in the same manner and under the same conditions as in Example I with the following results:

Table VI

| Run No. | Fiber Quality | Average Reactor Temp. °F. | | | Melt Index Product | % Product From Each Reactor | | | Max. Temp. Difference, °F.[1] |
|---|---|---|---|---|---|---|---|---|---|
| | | 1 | 2 | 3 | | 1 | 2 | 3 | |
| 1A | Good | 297 | 298 | 270 | 0.81 | 41 | 37 | [2] 22 | 28 |
| 2A | do | 300 | 299 | 270 | 0.75 | 44 | 38 | [2] 18 | 30 |
| 3A | Fair | 301 | 299 | 271 | 0.83 | 44 | 29 | [2] 18 | 30 |
| 4A | Good | 302 | 301 | 271 | 0.88 | 44 | 29 | [2] 18 | 31 |
| 5 | Poor | 302 | 302 | 271 | 0.87 | 44 | 29 | [2] 18 | 31 |
| 6 | Fair | 302 | 301 | 271 | 0.91 | 44 | 29 | [2] 18 | 31 |
| 7 | Poor | 302 | 302 | 270 | 0.85 | 44 | 29 | [2] 27 | 32 |
| 8 | Good | 306 | 300 | 270 | 0.95 | 33 | 40 | [2] 27 | 36 |
| 9 | do | 312 | 295 | 270 | 0.80 | 33 | 40 | [2] 27 | 42 |
| 10 | do | 312 | 296 | 271 | 0.86 | 33 | 40 | [2] 27 | 41 |
| 11 | do | 312 | 296 | 270 | 0.85 | 33 | 40 | [2] 27 | 42 |
| 12 | do | 312 | 296 | 271 | 0.93 | 33 | 40 | [2] 27 | 41 |
| 13 | do | 313 | 298 | 270 | 0.84 | 33 | 40 | [2] 27 | 43 |
| 14 | Fair | 318 | 318 | 270 | 0.99 | 33 | 40 | [2] 27 | 48 |
| 15 | Good | 319 | 319 | 271 | 1.11 | 33 | 40 | [2] 27 | 48 |
| 16 | do | 320 | 321 | 270 | 1.25 | 37 | 33 | [2] 30 | 50 |
| 17 | do | 323 | 322 | 270 | 1.49 | 37 | 33 | [2] 30 | 51 |
| 18 | Poor | 315 | 315 | 270 | 1.55 | 37 | 33 | [2] 30 | 45 |
| 19 | do | 327 | 323 | 312 | 4.97 | 27 | 33 | 40 | 15 |
| 20 | Fair | 280 | 256 | 270 | 0.23 | 27 | [2] 33 | [2] 40 | 10 |
| 21 | Poor | 282 | 268 | 280 | 0.28 | 27 | [2] 33 | 40 | 14 |
| 22 | Fair | 280 | 266 | 283 | 0.29 | 35 | [2] 25 | 40 | 22 |
| 23 | Good | 280 | 236 | 289 | 0.36 | 35 | [2] 25 | 49 | 23 |
| 24 | do | 295 | 270 | 299 | 0.70 | 35 | [2] 25 | 40 | 29 |
| 25 | Fair | 306 | 291 | 270 | 0.62 | 35 | 25 | [2] 40 | 36 |
| 26 | do | 305 | 292 | 270 | 0.69 | 33 | 38 | [2] 29 | 35 |
| 27 | Good | 305 | 292 | 270 | 0.66 | 33 | 38 | [2] 29 | 35 |
| 28 | Fair | 304 | 294 | 270 | 0.74 | 33 | 33 | [2] 29 | 34 |
| 29 | do | 305 | 294 | 270 | 0.59 | 33 | 33 | [2] 29 | 35 |
| 30 | do | 309 | 299 | 270 | 0.74 | 33 | 33 | [2] 29 | 39 |
| 31 | Good | 310 | 300 | 270 | 0.76 | 33 | 38 | [2] 29 | 40 |
| 32 | do | 310 | 300 | 270 | 0.84 | 33 | 33 | [2] 29 | 40 |
| 33 | do | 313 | 327 | 270 | 1.41 | 33 | 38 | [2] 29 | 57 |
| 34 | do | 315 | 329 | 270 | 1.51 | 38 | 38 | [2] 24 | 59 |
| 35 | Fair | 315 | 329 | 270 | 1.42 | 38 | 33 | [2] 24 | 59 |
| 36 | Good | 315 | 329 | 270 | 1.46 | 38 | 38 | [2] 24 | 59 |
| 37 | Fair | 315 | 329 | 270 | 1.42 | 38 | 38 | [2] 24 | 59 |
| 38 | do | 315 | 329 | 270 | 1.43 | 38 | 33 | [2] 24 | 59 |
| 39 | Good | 315 | 329 | 270 | 1.44 | 38 | 33 | [2] 24 | 59 |
| 40 | Fair | 315 | 329 | 270 | 1.45 | 38 | 33 | [2] 24 | 59 |
| 41 | Poor | 315 | 329 | 270 | 1.59 | 38 | 38 | [2] 24 | 59 |
| 42 | Fair | 292 | 276 | 275 | 0.32 | 33 | [2] 33 | [2] 34 | 17 |
| 43 | Good | 293 | 269 | 276 | 0.30 | 33 | [2] 33 | [2] 34 | 24 |
| 44 | do | 296 | 270 | 268 | 0.25 | 33 | [2] 33 | [2] 34 | 28 |
| 45 | do | 295 | 271 | 268 | 0.31 | 35 | [2] 33 | [2] 32 | 27 |
| 46 | do | 295 | 269 | 270 | 0.31 | 33 | [2] 33 | [2] 34 | 26 |

[1] Determined from average reactor temperatures.
[2] Percent product produced in temperature range of 265-280° F.

In each of the above runs except 19 which produced poor fiber-grade material, a substantial proportion of the polymer was produced in the temperature-range of 265-280° F., namely, from about 18 percent to about 73 percent. Out of the 46 runs which were carried out 25, or about 54 percent, produced good fiber-grade material, 15, or about 32 percent, produced fair fiber-grade material, and only 6, or about 16 percent produced poor fiber-grade material. Also, one of the six polymers rated poor did not contain any material produced in the temperature range from 265-280° F.

The polymer crystallinities were determined according to the following procedure: Two grams of polymer are placed in a one inch mold having aluminum foil discs covering each mold face. The sample is pressed cold to about 2000 p.s.i. and heated to 170-180° C., following which the pressure is increased to 5000 p.s.i. and maintained at this level for about 5 minutes at the same temperature. The sample is then cooled to 50-60° C. at a rate of about 4° C. per minute (in the temperature range of 150-120° C.). Following this the sample is cooled with air blast to room temperature after which it is removed from the mold and trimmed, if necessary, to provide one flat face. The sample is then placed in a rotating specimen holder of a North American Philips diffractometer and examined with a copper target X-ray tube operated at 40 kv. peak and 18 ma. using ½ degree divergent slits, 0.006 inch collecting slit, and nickel foil filter. The scintillation counter, X-ray detector, linear amplifier and pulse height analyzer are used with proper settings so that the system passes 90 percent of the counts due to K alpha radiation that would be passed in the absence of the analyzer. A time constant of 8 seconds is used and scale factors are selected so that the most intense peak of the pattern remains on the chart. The sample is scanned from 12 degrees two theta to 28 degrees two theta using a scanning speed of ½ degree two theta per minute and a charge speed of ½ inch per minute. At the beginning of each run the signal level existing with the X-ray beam shutter closed is recorded. To utilize the X-ray record a straight background line is drawn from the point on the curve at 15.4 degrees two theta to the point on the curve at 25.5 degrees two theta. From the point on the curve at 19.7 degrees two theta a straight line is drawn to the point on the curve at 17.7 degrees two theta and from there to the point at 15.4 degrees two theta. The height above the back ground of the point at 17.7 degrees two theta is measured and a point is marked at this same height above the background at 21.7 degrees two theta, then straight lines are drawn from this point to the peak of the amorphous band at 19.7 degrees two theta and to the point of the background line at 24.0 degrees two theta. These lines give the contribution of the amorphous band to the intensity in the region of the crystalline peaks. The area of the amorphous band in square centimeters is obtained from the formula $5.1a + 10.9b$ where $a$ and $b$ are the heights of the curve above background at 19.7 degrees and 17.7 degrees two theta, respectively, measured in centimeters. The 110 crystalline peak is resolved by drawing in the high angle sides so that it meets the amorphous line at about 23.0 degrees two theta. The area of the 110 and 200 crystalline peaks in square centimeters is measured using a metric planimeter. The percent crystallinity is then computed from the formula:

$$\frac{I_{110} + 1.45 I_{200}}{I_{110} + 1.45 I_{200} + 0.73 I_A} \times 100$$

where $I_{110}$, $I_{200}$, and $I$ are the areas of the 110 peak, 200 peak and amorphous band, respectively.

Having thus described the invention by providing specific examples thereof, it is to be understood that no undue limitations or restrictions are to be drawn by reason thereof and that many variations and modifications are within the scope of the invention.

I claim:

1. In a process wherein ethylene is polymerized to normally solid polymer in solution in an inert liquid solvent selected from the group consisting of paraffins and alicyclic hydrocarbons having from 5 to 12 carbon atoms per molecule at a temperature in the range 250 to 400° F. in the presence of a polymerization catalyst comprising chromium oxide supported on at least one material selected from the group consisting of silica, alumina, zirconia and thoria, at least part of the chromium being hexavalent, the improvement which comprises varying the polymerization temperature to effect an average range of temperature variation of between about 3 and about 75 Fahrenheit degrees and a maximum temperature variation of at least 10 Fahrenheit degrees, and commingling the polyethylene polymers formed at the different temperatures to produce a polymer composition which can be readily spun to form fibers, from about 5 to 75 weight percent of said polymer being formed at a temperature in the range of 265 to 285° F.

2. The improvement according to claim 1 wherein the average range of temperature variation is from about 8 to about 40 Fahrenheit degrees.

3. The improvement according to claim 1 wherein the polymerization temperature is varied by changing the temperature in a particular polymerization zone during the polymerization.

4. The improvement according to claim 1 wherein the temperature variation is produced by maintaining a temperature gradient in a particular polymerization zone.

5. The improvement according to claim 1 wherein the polymerization is conducted in at least two reaction zones maintained at different temperatures.

6. In a process wherein ethylene is polymerized to normally solid polymers at a temperature in the range 265 to 350° F. in the presence of a polymerization catalyst comprising chromium oxide supported on silica-alumina, at least part of the chromium being hexavalent, said polymers being formed in solution in an inert liquid hydrocarbon solvent selected from the group consisting of paraffins and alicyclic hydrocarbons having from 5 to 12 carbon atoms per molecule, the improvement which comprises varying the polymerization temperature to effect an average range of temperature variation of between about 7 and about 75 Fahrenheit degrees and a maximum temperature variation of at least 15 Fahrenheit degrees, and commingling the polymers formed at the different temperatures to produce a polymer which can be readily spun to form fibers, from about 10 to about 35 weight percent of said polymer being formed at a temperature in the range 265 to 285° F.

References Cited in the file of this patent

UNITED STATES PATENTS

| | | |
|---|---|---|
| 2,825,721 | Hogan et al. | Mar. 4, 1958 |
| 2,870,113 | Jones | Jan. 20, 1959 |
| 2,928,756 | Campbell | Mar. 15, 1960 |
| 2,956,035 | Mock | Oct. 11, 1960 |
| 2,964,514 | Fawcett | Dec. 13, 1960 |

UNITED STATES PATENT OFFICE
CERTIFICATE OF CORRECTION

Patent No. 3,127,370             March 31, 1964

Albert J. Head

It is hereby certified that error appears in the above numbered patent requiring correction and that the said Letters Patent should read as corrected below.

Column 12, line 36, for "7" read -- 5 --.

Signed and sealed this 3rd day of November 1964.

(SEAL)
Attest:

ERNEST W. SWIDER
Attesting Officer

EDWARD J. BRENNER
Commissioner of Patents